March 3, 1959  F. R. SIEMINSKI  2,875,515
EATING UTENSILS WITH REPLACEABLE ORNAMENTAL HANDLE PLATES
Filed Jan. 30, 1957
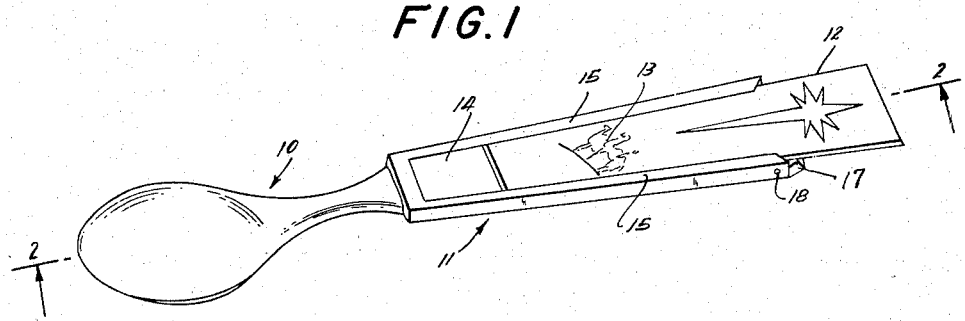
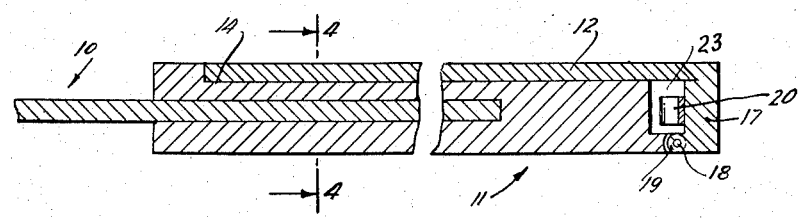
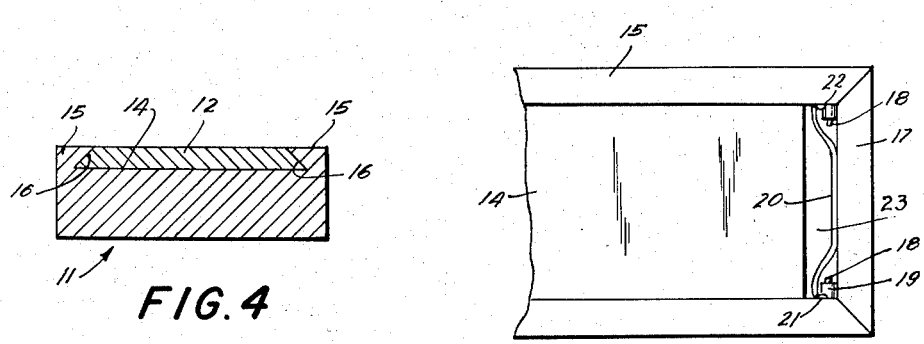
INVENTOR.
FRANK R. SIEMINSKI
BY
*Clark Ott*
ATTORNEYS

United States Patent Office 2,875,515
Patented Mar. 3, 1959

2,875,515

EATING UTENSILS WITH REPLACEABLE ORNAMENTAL HANDLE PLATES

Frank R. Sieminski, New York, N. Y.

Application January 30, 1957, Serial No. 637,138

1 Claim. (Cl. 30—1)

This invention relates to eating utensils provided with ornamental handle plates.

An object of the invention is to provide eating utensils with ornamental handle plates which are removable to permit of the use of handle plates of different designs.

Another object of the invention is to provide an eating utensil with means for slidably receiving and retaining a handle plate in association with the handle of the utensil.

Still another object of the invention is to provide an eating utensil with guide grooves for receiving a handle plate and with an end wall hingedly connected with the handle for closing the guide grooves to thereby retain the plate in associated relation with the handle.

Still another object of the invention is to provide an eating utensil with a removable handle plate associated therewith in a manner to convey the impression that the plate is formed as an integral part of the handle.

With the foregoing and other objects in view, reference is now made to the following specification and accompanying drawings in which the preferred embodiment of the invention is illustrated.

In the drawings:

Fig. 1 is a perspective view of an eating utensil having a handle provided with a removable ornamental plate constructed in accordance with the invention.

Fig 2 is a fragmentary enlarged longitudinal sectional view taken approximately on line 2—2 of Fig. 1.

Fig. 3 is an enlarged fragmentary top plan view of one end of the handle with the handle plate removed.

Fig. 4 is a vertically sectional view taken approximately on line 4—4 of Fig. 2.

The invention is shown in the drawings in its application to the handle of a teaspoon. It is to be understood that the same applies to eating utensils generally and includes in addition to spoons, knives and forks, spreaders and the like.

The teaspoon 10 is provided with a handle 11 which may be of any desired configuration and secured thereto in any desired manner. The handle 11 is provided with a handle plate 12 having an ornamental upper surface 13 and which is removably associated with the handle to permit of the use of variously ornamented plates therewith so as to vary the ornamental aspect of the eating utensil. As illustrated, the handle 11 is provided with an elongated recess 14 which extends longitudinally of the upper face intermediate the ends thereof. Longitudinal side edge portions 15 extend above the bottom of the recess 14 which are angularly undercut as at 16 for slidably receiving the handle plate 12. The handle plate has its opposite side edge correspondingly shaped to fit the recesses formed by the undercut edges 16.

The handle 11 is also recessed at its outer end as at 23 below the recess 14 and between the side wall portions 15. In order to close the outer end of the recesses 16 and retain the top plate 12 in associated relation with the handle, an end wall 17 is provided which is pivotally connected therewith by means of hinged pins 18 extending through lugs 19 formed integrally with the end wall 17 and with the pins extending into the side wall portions 15. This permits of the swinging of the end wall 17 from the open relation shown in Fig. 1 of the drawings to permit of the removal of the handle plate and the insertion of a differently ornamented plate to the closed position shown in Fig. 2 of the drawings. The end wall 17 is retained in closed position by means of a leaf spring 20 secured to the inner face thereof and arranged with the ends 21 adapted to spring back of knobs 22 on the inner faces of the side wall portions 15.

Constructed in this manner the end wall 17 may be conveniently swung to open relation to permit of the removal of the ornamental handle plate and the insertion of a differently ornamented plate, after which the end wall is swung and latched in closed relation to retain the ornamental plate in position so as to constitute the upper face of the handle.

While the preferred form of the invention has been shown and described herein, it is to be understood that the same is not so limited but shall cover and include any and all modifications of the invention which fall within the purview thereof.

What is claimed is:

An eating utensil including an eating implement, a handle connected therewith at one end thereof, said handle having raised longitudinally extending side edge portions on the upper face thereof, said side edge portions being undercut to form longitudinally extending grooves and providing a longitudinally extending recess in the upper face of said handle between said side edge portions which opens through the outer end of said handle, an end wall closing the open end of said recess, said end wall being pivotally connected to said handle adjacent the under side thereof for swinging movement to open and closed relation with reference to said recess and abutting against said side edge portions when in closed relation, said handle being formed with a depression in the end thereof confronting said end wall and extending inwardly from said recess, interengageable spring latch and keeper means arranged in said depression and carried by said end wall and handle respectively for releasably securing said end wall in closed relation, and an ornamental face plate slidably fitting said recess and said grooves and adapted to be inserted in and removed therefrom through the outer end of said handle when said end wall is in open relation, and said ornamental face plate covering and concealing said interengageable spring latch and keeper means when said end wall is in closed relation.

References Cited in the file of this patent

UNITED STATES PATENTS

| | | |
|---|---|---|
| 299,037 | Thompson et al. | May 20, 1884 |
| 638,555 | Burton | Dec. 5, 1899 |
| 2,651,839 | Folland | Sept. 15, 1953 |
| 2,658,272 | Lillard | Nov. 10, 1953 |